United States Patent [19]

Yi et al.

[11] Patent Number: 5,745,281
[45] Date of Patent: Apr. 28, 1998

[54] ELECTROSTATICALLY-DRIVEN LIGHT MODULATOR AND DISPLAY

[75] Inventors: You-Wen Yi, Yokohama; Mitsuchika Saito, Kawasaki, both of Japan

[73] Assignee: Hewlett-Packard Company, Palo Alto, Calif.

[21] Appl. No.: 771,566

[22] Filed: Dec. 20, 1996

[30] Foreign Application Priority Data

Dec. 29, 1995 [JP] Japan .................................. 7-352615

[51] Int. Cl.$^6$ .................................................. G02B 26/00
[52] U.S. Cl. ........................ 359/290; 359/291; 359/295; 359/308
[58] Field of Search ................................. 359/290, 291, 359/295, 308

[56] References Cited

U.S. PATENT DOCUMENTS

| | | | |
|---|---|---|---|
| 5,631,764 | 5/1997 | Chae | 359/291 |
| 5,646,772 | 7/1997 | Yurke | 359/291 |
| 5,654,819 | 8/1997 | Goosen et al. | 359/291 |

OTHER PUBLICATIONS

Hornbeck, Larry J., "Current Status of the Digital Micromirror Device (DMD) for Projection Television Applications", IEEE IEDM Meeting, Dec. 5–8, 1993, pp. 381–384.
Sampsell, J.B., "The Digital Micromirror Device and its Application to Projection Displays", The 7th Intl. Confrerence on Solid–State Sensors and Actuators, pp. 24–27. (no date available).

*Primary Examiner*—Frank G. Font
*Assistant Examiner*—Reginald A. Ratliff
*Attorney, Agent, or Firm*—Ian Hardcastle

[57] ABSTRACT

A light modulator having the small volume and low power consumption of LCD displays together with the higher resolution and faster response time of CRT displays. The light modulator includes a substrate pair, an opaque light shielding layer, a shutter assembly composed of a shutter plate and a shutter suspension, and electrodes. The substrate pair includes a first substrate and a second substrate positioned parallel to each other and spaced from one another to define a cavity. The opaque light shielding layer is located on one of the substrates, and defines a translucent window. The shutter assembly is located in the cavity. The shutter plate is movably mounted adjacent the window by the shutter suspension. The shutter suspension includes elastic support members disposed between the shutter plate and the substrate pair. The shutter suspension has a mechanically-stable position and deforms elastically from the mechanically-stable position in response to a change in overlap between the shutter plate and the mirror. The overlap between the shutter plate and the window controls the amount of light passing through the window. Finally, the electrodes are located on at least two of (a) the shutter assembly, (b) an inside surface of the first substrate, and (c) an inside surface of the second substrate, and are located to change the overlap between the shutter plate and the window by electrostatic force.

20 Claims, 9 Drawing Sheets

ELECTROSTATICALLY-DRIVEN LIGHT MODULATOR AND DISPLAY

FIELD OF THE INVENTION

The present invention relates to light modulators and displays using the light modulators. The light modulators according to the invention can also be used in two-dimensional filters for various electromagnetic waves, including visible light, infrared light, and ultraviolet light, two-dimensional light modulators and light modulators used in two-dimensional optical computers.

BACKGROUND OF THE INVENTION

Conventional displays used in computers include cathode ray tube (CRT) displays and liquid crystal displays (LCDs). Cathode ray tubes have the disadvantages of having a large volume of a given display area, and large power consumption. Therefore, a thin, low power-consuming display like a liquid crystal display is considered to be the future trend. Liquid crystal displays lack the main disadvantages of CRTs, but have disadvantages of their own, such as low contrast, slow response speed and an tendency to flicker. For example, the response time of color liquid crystal displays driven by thin film transistors (TFT) ranges from several tens to several hundreds of milliseconds.

A computer display having the small volume and low power consumption of LCD displays, but having the higher resolution and faster response time of CRT displays is desirable.

SUMMARY OF THE INVENTION

The invention provides a light modulator that has the small volume and low power consumption of LCD displays together with the higher resolution and faster response time of CRT displays. The light modulator includes a substrate pair, an opaque light shielding layer, a shutter assembly composed of a shutter plate and a shutter suspension, and electrodes. The substrate pair includes a first substrate and a second substrate positioned parallel to each other and spaced from one another to define a cavity. The opaque light shielding layer is located on at least one of the substrates, and defines a translucent window. The shutter assembly is located in the cavity. The shutter plate is movably mounted adjacent the window by the shutter suspension. The shutter suspension includes elastic support members disposed between the shutter plate and the substrate pair. The shutter suspension has a mechanically-stable position and deforms elastically from the mechanically-stable position in response to a change in overlap between the shutter plate and the window. The overlap between the shutter plate and the window controls the amount of light passing through the window. Finally, the electrodes are located on at least two of (a) the shutter assembly, (b) an inside surface of the first substrate, and (c) an inside surface of the second substrate, and are located to change the overlap between the shutter plate and the window by electrostatic force.

The light modulator may operate in transmission mode. In this case, the light shielding layer is formed on the first substrate, or on the second substrate, or on both substrates. A first one of the electrodes is located on the inside surface of the first substrate and is translucent. A second one of the electrodes is located on the inside surface of the second substrate and is translucent. With this structure, the light passes through the first substrate and the second substrate.

Alternatively, the light shielding layer may be formed on the second substrate.

Alternatively, the light modulator may operate in reflection mode. In this case, a first one of the electrodes is located on the inside surface of the first substrate and is translucent. A second one of the electrodes is located on the inside surface of the second substrate and is reflecting. With this structure, the light passes through the first substrate, and is reflected by the second one of the electrodes so does not pass through the second substrate.

The shutter plate may be formed from a polymer. The shutter assembly may be an integral unit, with the shutter plate formed integrally with the shutter suspension.

The electrodes may be formed only on the first and second substrates.

Spacers may be disposed between the first substrate and the second substrate, and the shutter suspension may be connected to the spacers.

The shutter plate may include plural shutter plate segments, in which case, the light shielding layer defines a window segment corresponding to each of the shutter plate segments and one of the electrodes is divided into an electrode segment corresponding to each of the shutter plate segments.

A color filter may be mounted on the first substrate or the second substrate in alignment with the window.

The cavity may contain a fluid having a resistivity differing from the resistivity of the material of the shutter plate by a factor of greater than ten. Alternatively, the fluid may have a dielectric constant differing from the dielectric constant of the material of the shutter plate by a factor of greater than two.

Finally, the light modulator may constitute one cell of a display composed of multiple cells.

BRIEF DESCRIPTION OF THE DRAWINGS

FIGS. 1A and 1B are cross-sectional views showing a first, transmission-mode embodiment according to the light modulator of the present invention.

DETAILED DESCRIPTION OF THE INVENTION

The light modulator according to the present invention includes a substrate pair composed of a first substrate placed parallel to a second substrate to define a cavity between the substrates. An opaque light shielding layer defining a translucent window is formed on one or both substrates.

The light modulator additionally includes a shutter assembly, preferably composed of a polymer material. The shutter assembly includes a shutter plate and a shutter suspension. The shutter plate is located in the cavity, adjacent the translucent window, and is capable of movement parallel to the substrates to overlap the window. The shutter varies the amount of light transmitted between the first substrate and the second substrate, or vice versa, depending on the overlap between the shutter plate and the translucent window.

The shutter suspension is elastic and supports the shutter plate in the cavity between the substrates. One end of the shutter suspension is fixed to the substrate pair. The other end of the shutter suspension is attached to the shutter plate.

The shutter suspension may be composed of two elastic suspension members disposed on opposite sides of the shutter plate in the direction of motion of the shutter plate, for example. One end of each suspension member can be fixed to the substrate pair with the other end of each suspension member attached to the shutter plate.

Moreover, the shutter plate may be segmented into multiple shutter plate segments. In this case, the shutter suspension supports the whole segmented shutter plate. The shutter plate segments may be serially disposed relative to one another in the direction of motion of the shutter plate, or may be disposed parallel to one another, in a direction perpendicular to the direction of motion, or may form an array, with some shutter plate segments disposed in the direction of motion, and others disposed perpendicular to the direction of motion. The shutter plate segments may be attached to one another, and the whole segmented shutter plate attached to the suspension members. In addition, the number of suspension members forming the shutter suspension can be increased when appropriate.

Irrespective of whether the shutter plate is segmented or not, the shutter plate is moved by electrostatic force exerted by at least two electrodes, to be described below. After the shutter plate has been moved, the shutter suspension generates the force to restore the shutter plate to a mechanically-stable position. The mechanically-stable position of the shutter plate may correspond to no overlap between the shutter plate and the translucent window, or alternatively may correspond to a complete overlap between the shutter plate and the translucent window.

The shutter assembly may additionally include intervening parts such as spacers that extend between the first substrate and the second substrate and to which the elastic suspension members are fixed. To simplify the construction of the light modulator, the shutter assembly, including the shutter plate and the suspension members can be formed as an integral unit with at least part of the spacers.

The shutter plate is moved by electrostatic force created by applying a drive voltage to electrodes located on at least two of the following: the shutter assembly, the first substrate, and the second substrate. The electrostatic force may move the shutter plate by attraction or repulsion. The drive voltage is usually a unidirectional pulse. The electrodes normally include a single pair of electrodes, but may include more electrodes than this. Movement of the shutter plate changes the overlap between the shutter plate and the translucent window. When the drive voltage is removed from the electrodes, the shutter suspension elastically restores the shutter plate to its mechanically-stable position.

The light modulator can be structured so that the shutter plate has approximately zero overlap with the translucent window at the mechanically-stable position. In this case, applying the drive voltage to the electrodes increases the overlap. A sufficiently high drive voltage will move the shutter plate to a position where it completely overlaps the window. Alternatively, the shutter plate can completely overlap the translucent window at its mechanically-stable position. In this case, applying the drive voltage to the electrodes reduces the overlap. A sufficiently high drive voltage will move the shutter plate to a position where it has approximately zero overlap with the window.

In one embodiment of the light modulator of the present invention, the first and second substrates are both translucent and the light shielding layer can be formed on one or both of them. In this embodiment, moving the shutter plate changes the amount of light that passes through the translucent window after passing into the cavity from the second substrate or the first substrate.

In a second embodiment of the light modulator, the first substrate is translucent, the light shielding layer is formed on the first substrate, and a light reflecting layer is formed on the inside surface of the second substrate. The inside surface of each substrate is the surface of the substrate that faces the other substrate. In this embodiment, moving the shutter plate changes the amount of light reflected by the light reflecting layer and passing back through the translucent window after entering the cavity through the translucent window.

In a variation on this embodiment, the light reflecting layer is formed on the inside surface of the first substrate. In this variation, light enters and leaves the cavity through the second substrate, which should have a low reflectivity.

The cavity between the first and second substrates constituting the substrate pair may be created by placing spacers between the substrates. Multiple light modulators according to the invention may be arranged in an array and may be used to provide a display. In this application, each individual light modulator, composed of at least one shutter assembly and at least two electrodes, will be referred to as a cell. Each cell provides one pixel of the display. The cavity may belong exclusively to a single cell. Alternatively, the cavity may be common to multiple cells. To increase in the electrostatic force exerted on the shutter plate for a given drive voltage, a fluid may be sealed in the cavity. Filling the cavity with a fluid enables the shutter plate to be moved a given distance relative to the window using a smaller drive voltage.

The light modulator according to the invention may employ what will be termed a "conductive" shutter plate. In this case, the resistivity of the material of the shutter plate is less than about $10^{10} \Omega \cdot cm$. When a conductive shutter plate is used, the resistivity of the fluid should be at least ten times greater than that of the material of the shutter plate, and in any case should be greater than about $10^7 \Omega \cdot cm$.

As a first alternative, the light modulator may employ what will be termed "conductive" fluid. In this case, the resistivity of the fluid is less than about $10^{10} \Omega \cdot cm$. When conductive fluid is used, the resistivity of the material of the shutter plate should be at least ten times greater than that of the fluid, and in any case should be greater than about $10^7 \Omega \cdot cm$.

As a second, preferred, alternative, the light modulator according to the invention may employ what will be termed a "low dielectric constant" shutter plate. In this case, the dielectric constant of the material of the shutter plate is less than about five. When a low dielectric constant shutter plate is used, the dielectric constant of the fluid should be at least twice that of the material of the shutter plate. The resistivities of both the fluid and the material of the shutter plate should be greater than about $10^7 \Omega \cdot cm$.

As a third alternative, the light modulator according to the invention may employ what will be termed a "high dielectric constant" shutter plate. In this case, the dielectric constant of the material of the shutter plate is greater than about five. When a high dielectric constant shutter plate is used, the dielectric constant of the material of the shutter plate should be at least twice that of the fluid. The resistivities of both the fluid and the material of the shutter plate should be greater than about $10^7 \Omega \cdot cm$.

Arrays of the light modulators according to the invention can be used in such devices as monochrome or color displays and overhead projectors. To make a color display, a matrix of red, green, and blue trichromatic filters can be formed on the first or second substrate, one filter for each cell.

The first embodiment of a light modulator according to the present invention will now be described with reference to FIGS. 1A and 1B. These figures will be collectively referred to as FIG. 1.

Figure 1A:
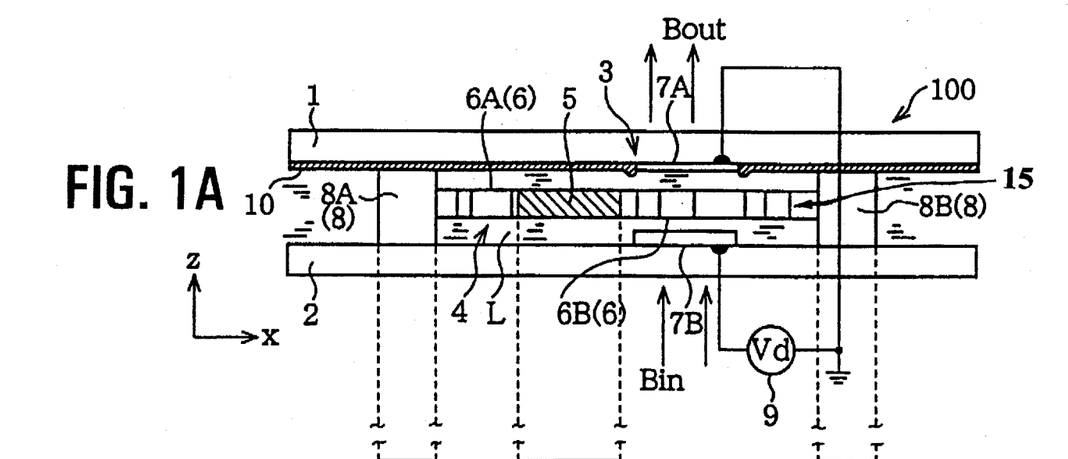
FIG. 1A is a cross-sectional side view of the light modulator.

FIG. 1A shows a side view of the light modulator 100. The light modulator may be a single light modulator, or may be one cell in of an array of light modulators constituting a display. The light modulator 100 includes a substrate pair composed of the first substrate 1 and the second substrate 2. Spacers, collectively indicated by the reference numeral 8, separate the first substrate from the second substrate to form the cavity 4. The spacers may have the planar rectangular shape shown in FIG. 1B. In FIG. 1, the spacers 8A and 8B are shown as examples of the spacers 8.

The first and second substrates 1 and 2 are both translucent. Each substrate may be a glass plate, but other suitable planar translucent materials may be used. For example, an organic polymer film can be used to reduce weight and provide greater mechanical flexibility. A light source (not shown) is located adjacent the second substrate 2, remote from the first substrate 1.

The opaque light shielding layer 10 is formed on the inside surface of the first substrate 1. In this disclosure, the inside surface of a substrate is the surface of the substrate that faces the other substrate. An aperture in the light shielding layer defines the translucent window 3. When the light modulator 100 constitutes one cell of a display, for example, multiple apertures are formed in the light shielding layer to define an array of windows.

The substrates 1 and 2 define the cavity 4 which is filled with the dielectric fluid L. The shutter assembly 15, composed of the shutter plate 5 and the shutter suspension 6, is located in the cavity.

The shutter suspension 6 extends between the spacers 8A and 8B and the shutter plate 5. In this embodiment, the shutter suspension 6 is composed of the elastic suspension members 6A and 6B. One end of each suspension member 6A and 6B is fixed to the spacers 8A and 8B, respectively.

The other end of each suspension member is attached to the shutter plate. In the example shown in FIG. 1B, the suspension members 6A and 6B have a folded-beam structure that makes the shutter suspension compliant in the direction of motion of the shutter plate. The shutter suspension 6 supports the shutter plate 5 parallel to the substrates 1 and 2 in the cavity 4 and allows the shutter plate to move parallel to the substrates in a direction that changes the overlap between the shutter plate and the window 3.

The shutter plate 5 is formed of an opaque material. As will be discussed in more detail below, the material of the shutter plate may have a resistivity ranging from high to low, and may have a dielectric constant ranging from high to low. The width and length of the shutter plate (in the x and y directions shown in FIG. 1B) are slightly larger than the width and length, respectively, of the window 3. Changing the overlap between the shutter plate and the window 3 changes the amount of light transmitted through the window. In this embodiment, the shutter suspension 6 holds the shutter plate in a mechanically-stable position where the shutter plate has a zero overlap with the window. However, the shutter suspension is formed to allow the shutter plate to move to a position where the shutter plate completely overlaps the window and prevents light from being transmitted through the window.

The shutter plate 5 is moved from its mechanically-stable position by an electrostatic force exerted by applying a drive voltage to the electrodes 7A and 7B. The electrode 7A covers the window 3 on the inside surface of the first substrate 1. The electrode 7B is located on the inside surface the second substrate 2, opposite the electrode 7A. The electrodes 7A and 7B are both translucent in this embodiment. The power source 9 is connected between the electrodes. The power source 9 can apply a specific value of the drive voltage Vd between the electrodes to move the shutter plate 5 by electrostatic attraction.

The light modulator 100 preferably requires a drive voltage Vd of less than 10 V, and even more preferably requires a drive voltage of less than several volts. The value of the drive voltage Vd greatly depends on the spring constants of the suspension members 6A and 6B. The spring constants of the suspension members depend on the coefficient of elasticity of the material of the suspension members, and on the dimensions of the suspension members. Inorganic materials, such as silicon or aluminum, generally have large coefficients of elasticity. Suspension members made of these materials must have cross-sectional dimensions as small as about 0.1 µm for a drive voltage Vd of less than about 10 V to be used.

The coefficient of elasticity of organic polymer materials such as polyimide or polymethyl methacrylate (PMMA) is usually less than one tenth of that of the above-mentioned inorganic materials. Therefore, the suspension members 6A and 6B are preferably formed using polyimides. This enables the suspension members to have larger cross-sectional dimensions while keeping the drive voltage Vd below about 10 V.

If the cross-sectional dimensions of the suspension members 6A and 6B are about 1 µm, the suspension members can be inexpensively formed with a high yield using conventional photolithographic processing employing a contact-type photomask. If a drive voltage somewhat higher than about 10 V can be used, the cross-sectional dimensions of the suspension members can be increased beyond 1 µm. This would allow the suspension members 6A and 6B to be formed using printing techniques that are even lower in cost.

Many different liquids can be used as the dielectric fluid L. A dielectric liquid with a low dielectric constant of about 3 and a high resistivity of about $10^{14} \Omega \cdot cm$ may be used. An example of a dielectric liquid with such characteristics is the liquid fluorocarbon sold under the brand name Fluorinert™. Dielectric liquids with a dielectric constant of 20 or more at room temperature, such as water, ethanol, methanol, ethylene glycol, and formamide may also be used. In the preferred embodiment, a liquid crystal was used as the fluid L. The dielectric fluid L is also used to damp the movement of the shutter plate 5, and therefore must have a viscosity suitable for this purpose. The preferred viscosity depends on a number of factors including the desired response speed of the light modulator, the spring constant of the shutter suspension, the drive voltage, etc.

Using a low resistivity liquid, such as water, as the dielectric fluid L results in a high leakage current. This results in the equilibrium state of the shutter plate 5 having a short hold time. A short hold time is generally undesirable, and a hold time of some length is usually preferable.

To obtain the desired combination of resistivity, dielectric constant and viscosity, several different liquids may be mixed to form the dielectric fluid L.

When the material of shutter plate 5 is relatively conductive, and the dielectric fluid L has a significant dielectric constant, the electrodes 7A and 7B will exert a large electrostatic attraction on the shutter plate. A conductive polymer material can be used as the shutter plate 5. The preferred materials of the shutter plate are polyimide or PMMA. Both of these materials normally have a very high resistivity, but the resistivity of these materials can be significantly reduced by injecting carbon or nitrogen ions into the material. Alternatively, a conducting layer may be formed in or on the shutter plate 5.

Figure 1B:
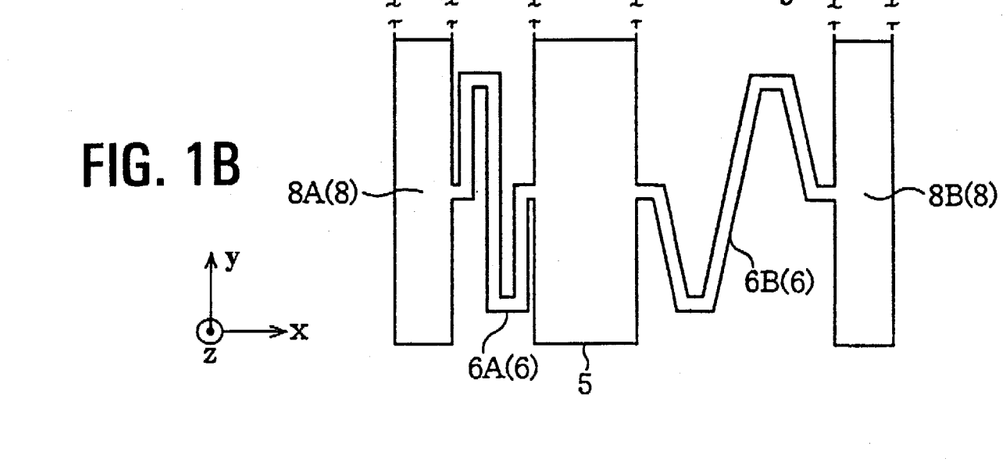
FIG. 1B is a top view showing how the shutter plate suspension connects the shutter plate to the spacers.

FIG. 1B is a top view showing how the suspension members 6A and 6B constituting the shutter suspension 6 connect the shutter plate 5 to the spacers 8A and 8B. The suspension members are formed so that when the drive voltage Vd is 0 V, the shutter suspension holds the shutter plate 5 in a mechanically-stable position where there is no overlap between the shutter plate and the window 3. The input light Bin, incident on the second substrate 2, passes through the second substrate and into the cavity 4, and then passes through the window and the first substrate 1 as the output light Bout.

A D.C. drive voltage Vd applied between the electrodes 7A and 7B attracts the shutter plate 5 towards the location of the electrodes. This results in movement of the shutter plate in the x direction shown in the Figure.

Figure 2A:
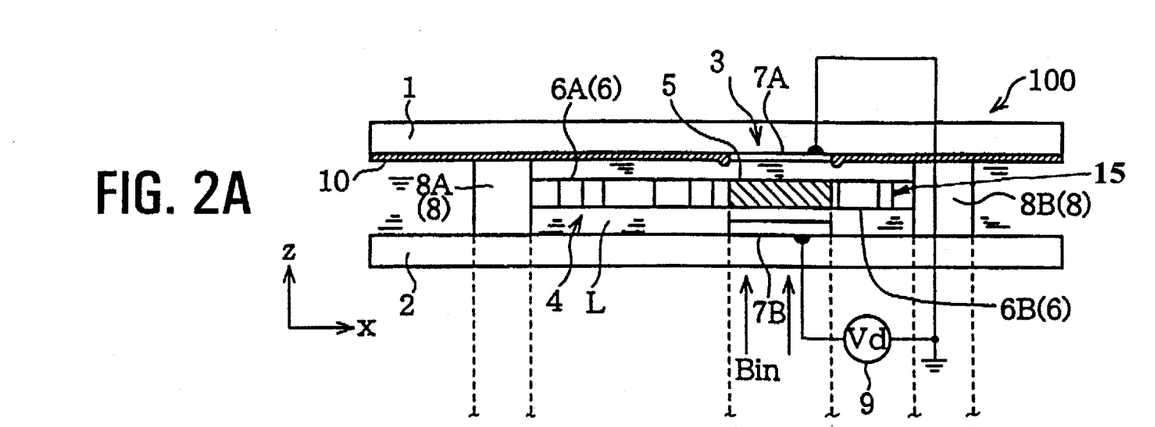
FIGS. 2A and 2B correspond to FIGS. 1A and B, and show how the shutter plate moves in response to the drive voltage.
Figure 2B:
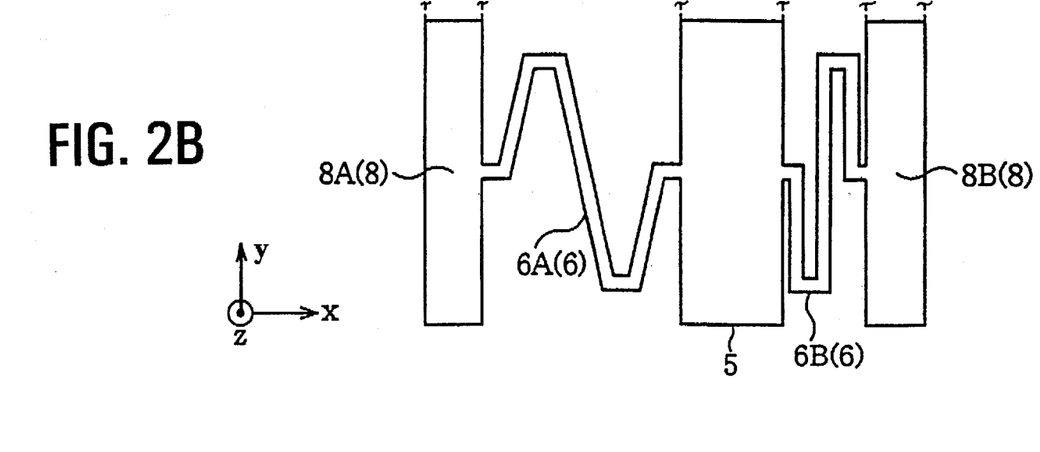

FIG. 1 shows the state of the light modulator 100 when the drive voltage Vd is 0V. FIGS. 2A and 2B, collectively referred to as FIG. 2, show the state of the light modulator when the drive voltage is greater than 0V. In the state shown in FIG. 2, the voltage applied to the electrodes 7A and 7B has moved the shutter plate 5 sufficiently towards the electrodes in the x-direction that the shutter plate completely overlaps the window 3. As mentioned above, the amount of incident light Bin that passes through the window is determined by the position of the shutter plate 5 relative to the window.

Although not shown in the figures, either the electrode 7A or the electrode 7B may be omitted, and the drive voltage Vd applied to the shutter plate 5. If this is done, a relatively conductive material should be used for the shutter plate 5. However, applying the drive voltage to the shutter plate subjects the shutter plate to an electrostatic force in the z direction, perpendicular to the first and second substrates 1 and 2. This force causes friction between the shutter plate and the adjacent substrate, which prevents the shutter plate 5 from moving smoothly.

In contrast, in the light modulator 100 shown in FIG. 1, the direct drive voltage Vd is not applied directly to the shutter plate 5. The electrodes 7A and 7B apply equal and opposite electrostatic forces to the shutter plate in the z-direction. Consequently, the forces applied to the shutter plate cancel out, and the shutter plate can move smoothly back and forth.

In a preferred embodiment of the light modulator 100, the material of the shutter plate 5 is polyimide that has been modified as described above to make it relatively conductive, and the dielectric fluid L is a liquid crystal having a relatively high dielectric constant. However, the material of the shutter plate 5 may alternatively have a relatively high dielectric constant. In this case, the shutter plate 5 can be moved by electrostatic attraction as described above if the dielectric fluid has a smaller dielectric constant than that of the material of the shutter plate.

The shutter plate 5 can alternatively be constructed from a material having a relatively low dielectric material, and the dielectric fluid L can be a liquid having a greater dielectric constant than that of the material of the shutter plate. In this case, the shutter plate is moved by electrostatic repulsion. When the shutter plate is moved by electrostatic repulsion, the shutter suspension 6 is configured to have a mechanically-stable position in which the shutter plate is located at the position shown in FIG. 2. Increasing the drive voltage Vd from 0 V moves the shutter plate in the -x direction away from the electrodes 7A and 7B until the shutter plate reaches the position shown in FIG. 1.

Furthermore, as briefly noted above, the shutter plate 5 can be formed from a material having a low conductivity, and the dielectric fluid L can have a greater conductivity greater than that of the shutter plate. In this case, the shutter plate 5 is moved by electrostatic repulsion. However, to prevent current from flowing between the electrodes 7A and 7B, the electrodes must be covered with a thin insulating film. In addition, when the light modulator constitutes a cell in an array of cells constituting a display, the cavity of the cell must be insulated from the cavities of neighboring cells to prevent interaction between neighboring cells. The spacers 8 may serve as suitable insulators, for example.

Figure 3A:
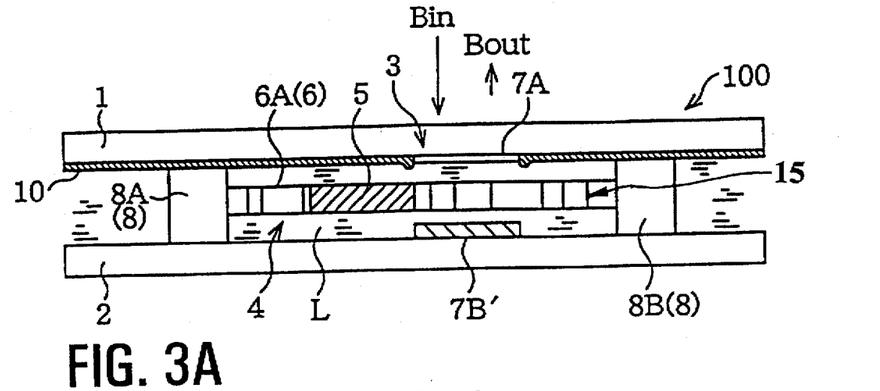
FIGS. 3A–3C show a second, reflection-mode, embodiment of the light modulator according to the present invention.
Figure 3B:
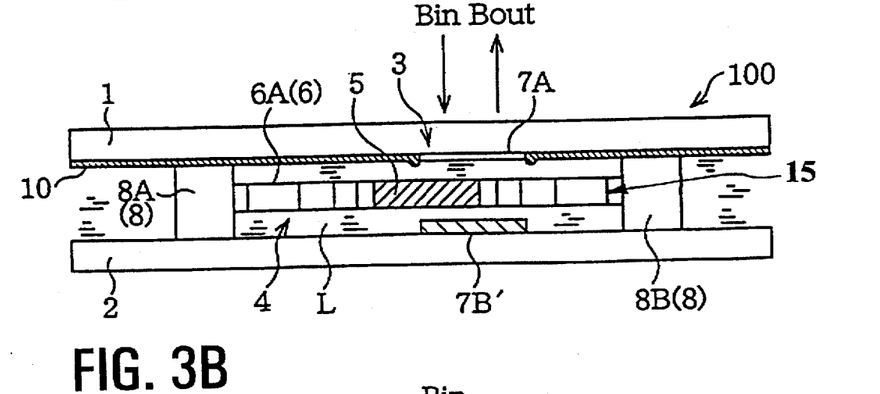
Figure 3C:
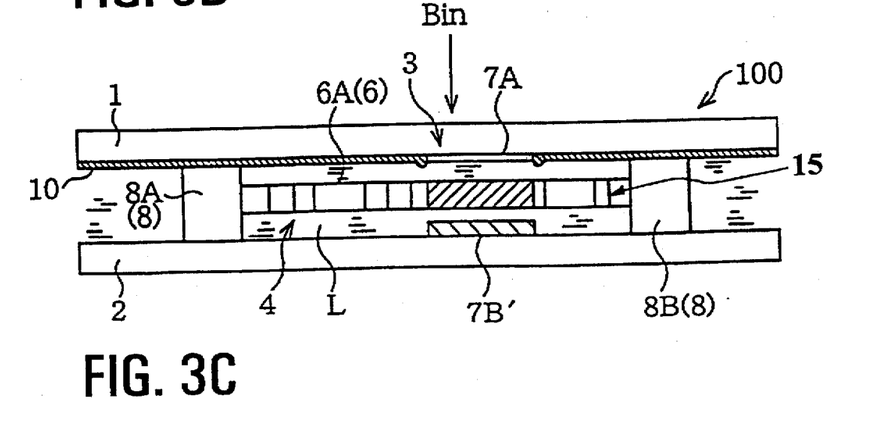

FIGS. 3A–3C, collectively referred to as FIG. 3, show a second embodiment of the light modulator according to the present invention. In contrast the embodiment shown in FIG. 1, which operates by transmission, the embodiment shown FIG. 3 operates by reflection. The incident light Bin passes through the window 3 into the cavity 4, and is reflected by a light-reflective layer formed on the second substrate 2. The fraction of the incident light that is reflected is changed by the position of the shutter plate 5. The reflected light passes back through the window 3 as the output light Bout.

The electrode 7B' on the second substrate 2 serves as the reflective layer in the light modulator shown in FIG. 3. The electrode 7B' is a layer of a conductive material having a high reflectivity, such as aluminum. The material of the shutter plate 5 has a low transmissivity and reflectivity, and preferably contains a black pigment.

In the embodiment shown in FIG. 3, the fraction of the incident light Bin reflected as the output light Bout is changed by changing the position of the shutter plate 5. Specifically, when the shutter plate 5 is in the position shown in FIG. 3A, the shutter plate blocks none of the incident light Bin from reaching the reflective electrode 7B', and the fraction of the incident light Bin reflected as the output light Bout is close to 100%. When the shutter plate is in the position shown in FIG. 3B, the shutter plate blocks a portion of the incident light Bin from reaching the reflective electrode 7B', and reflective electrode reflects the fraction of the incident light Bin that is not blocked as the output light Bout. When the shutter plate is in the position shown in FIG. 3C, the shutter plate 5 blocks all of the incident light Bin from reaching the reflective electrode, and none of the incident light is reflected as the output light Bout.

The efficiency of the light modulator described above depends on the ratio of the area of the window 3 to the area of the first substrate 1 or the second substrate 2 occupied by the cell. This ratio will be called the aperture ratio. The efficiency of the light modulator is increased by increasing the aperture ratio, which, in turn, is increased by increasing the area of the window relative to the area of the cell. Increasing the area of the window 3 to increase the aperture ratio requires that the area of the shutter plate 5 also be increased. This increases the distance that the shutter plate 5 must move, which increases the drive voltage Vd. To prevent the drive voltage Vd from becoming too large, it may be necessary to use thinner suspension members 6A and 6B. However, as discussed above, thinner suspension members are more expensive to produce.

Figure 4A:
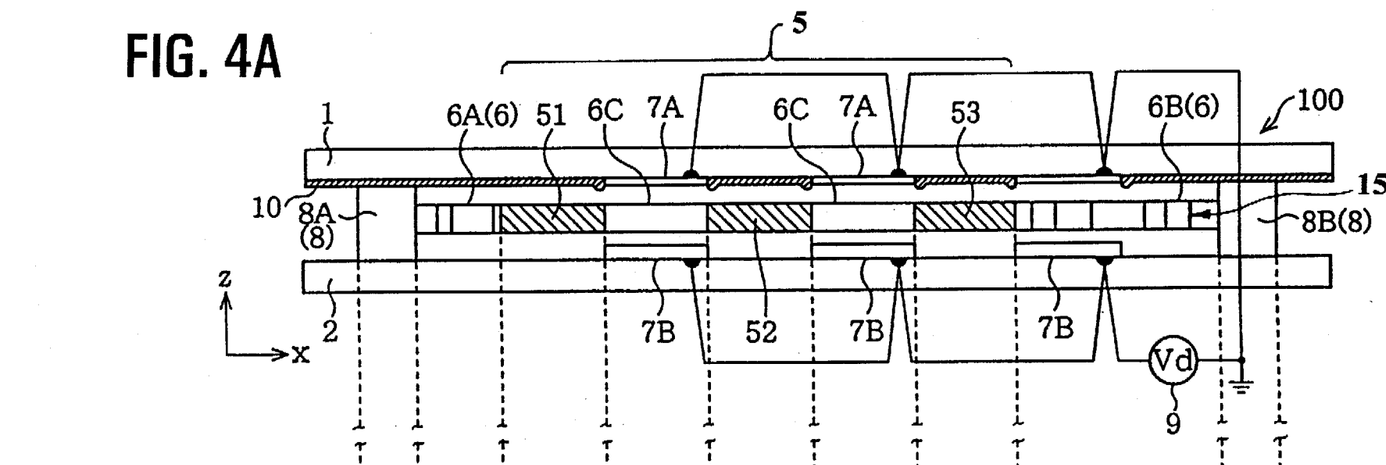
FIG. 4A and 4B show a third embodiment of the light modulator according to the present invention in which multiple shutter plates are connected in series.
Figure 4B:
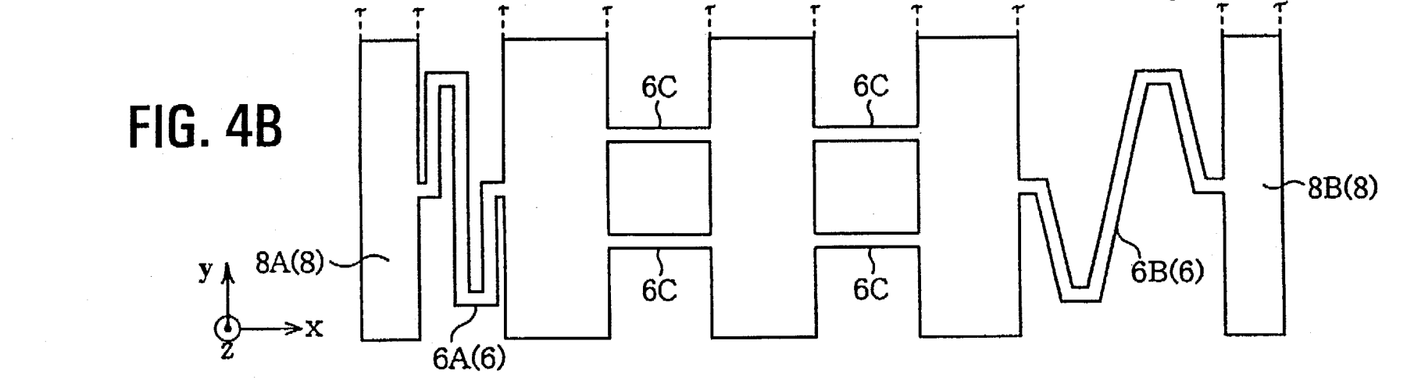

FIGS. 4A and 4B, collectively referred to as FIG. 4, show a third embodiment of the light modulator according to the invention. In this embodiment, the area of the window 3 is increased without the problems just described by dividing the shutter plate into multiple, serially-connected, shutter plate segments. Additionally, the window 3 is divided into multiple window segments, each corresponding to one of the shutter plate segments; and each of the electrodes 7A and 7B is divided into multiple, electrically-interconnected electrode segments, each corresponding to one of the shutter segments. In the embodiment shown in FIG. 4, the shutter plate 5 is divided into the three shutter plate segments 51, 52 and 53, and the window and the electrodes are therefore each divided into three segments, each corresponding to one of the shutter plate segments.

In a high-resolution display, the size of one pixel is roughly 200 µm×200 µm. In a high-resolution display using an array of light modulators similar to the embodiment shown in FIG. 4, if the size of each of the windows 3 is 10 µm×200 µm, then a cell using ten, serially-arranged shutter plates 5 will provide a pixel of roughly 200 µm×200 µm.

Using a shutter plate composed of multiple, serially-connected shutter plate segments 51–53, as described above, instead of one large shutter plate has the following advantages. First, the aperture ratio is increased since one, short-travel shutter suspension 6 is used to support all of the shutter plate segments. Second, since the electrostatic force applied to the shutter plate is substantially proportional to the number of shutter plate segments, the electrostatic force applied to a shutter plate composed of n serially-connected shutter plate segments for a given drive voltage Vd is n times the force applied to a single shutter plate of the same area. This has the advantage of further lowering the drive voltage Vd, or allowing the cross-sectional dimensions of the suspension members 6A and 6B to be increased.

Figure 5:
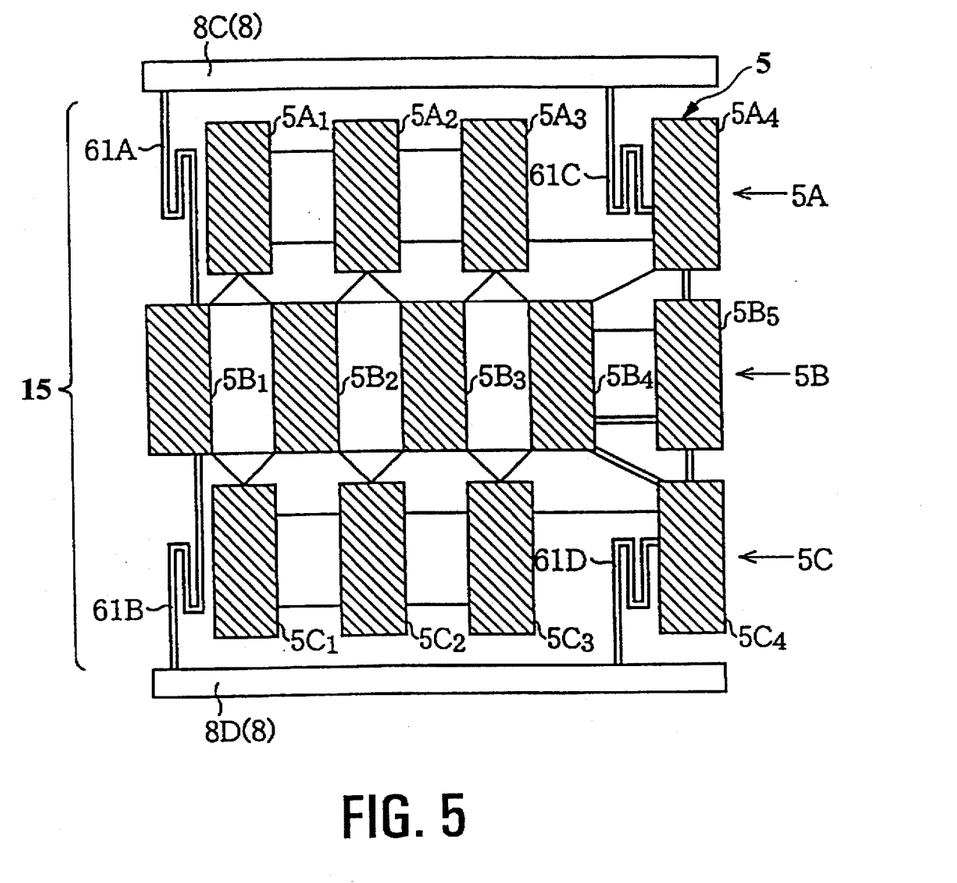
FIG. 5 shows a variation of the light modulator according to the present invention in which the shutter plate is segmented into three parallel plate groups, each plate group composed of multiple, serially-arranged, shutter plate segments.

The shutter plate segments can be interconnected serially, as just described, and, in addition, can be interconnected in parallel. In this case, the shutter suspension should allow the multiple shutter plate segments only to move in one direction, e.g., the x-direction in FIG. 1. For example, FIG. 5 shows the shutter plate 5, suspension members 61A, 61B, 61C and 61D, and spacers 8 of a variation on the third embodiment of the light modulator according to the invention. In this variation, the shutter plate is divided into 13 shutter plate segments arranged in three shutter plate groups 5A, 5B and 5C. The shutter plate groups are disposed parallel to one another. The shutter plate segments forming each shutter plate group are serially interconnected in a fixed spatial relationship. The shutter plate groups 5A, 5B and 5C are composed of the shutter plate segments $5A_1$ to $5A_4$, $5B_1$ to $5B_5$, and $5C_1$ to $5C_4$, respectively. The shutter plate groups 5A–5C are interconnected in parallel in a fixed spatial relationship to form the shutter plate 5. The shutter plate 5 is connected to the spacers 8 by the suspension members 61A–61D installed at appropriate positions. In FIG. 5, the spacers 8C and 8D are shown as examples of the spacers 8. In the example shown, two suspension members 61A and 61B are connected to the shutter plate segment $5B_1$ and the suspension members 61C and 61C are connected to the shutter plate segments $5A_4$ and $5C_4$, respectively. Although not shown in FIG. 5, in each cell, all the electrode segments on the first substrate are electrically connected to one another, and all the electrode segments on the second substrate are electrically connected to one another, similar to the electrode segments shown in FIG. 4.

A light modulator using the shutter plate shown in FIG. 5, composed of the shutter plate groups 5A–5C, the suspension members 61A–61D, and the corresponding segmented electrodes and segmented windows may be used as a cell constituting one pixel of a display.

A number of factors limit the aperture ratio that can be achieved in practice. As will be described below in the method of making the light modulator, the light modulator shown in FIG. 1, for example, is assembled by joining together a first substrate assembly and a second substrate assembly. The first substrate assembly is composed of the first substrate 1, on which are mounted a first portion of each of the spacers 8A and 8B, the light shielding layer 10, and the electrode 7A. The second substrate assembly is composed of the second substrate 2, on which are mounted the remaining second portion of each of the spacers 8A and 8B, the shutter suspension 6, the shutter plate 5, and the electrode 7B.

Since components of the cell, such as the spacers, shutter suspension, shutter plate, electrodes, etc., are formed on both substrates, a tolerance in the registration between the first substrate assembly and the second substrate assembly when the substrate assemblies are joined together may cause the components formed on the first substrate to be laterally offset from the components formed on the second substrate. This offset becomes more significant when the cell is one of an array of cells constituting part of a large-area display. To accommodate this offset, a margin must be provided on the dimensions of the electrodes 7A and 7B and of the window 3. However, providing this margin decreases the aperture ratio.

Figure 6:
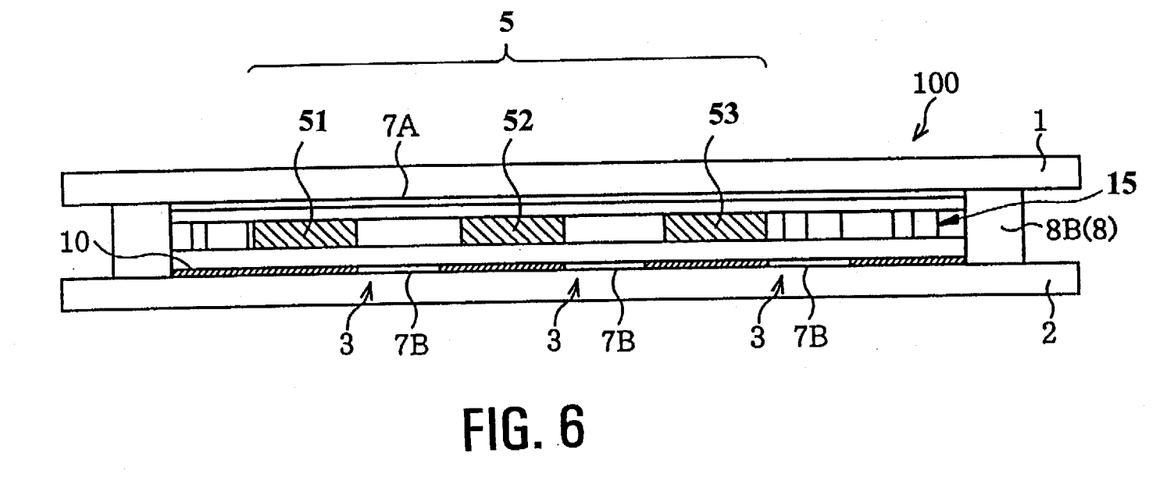
FIG. 6 shows a fourth embodiment of the light modulator according to the present invention in which the light shielding layer is located on the second substrate, and one of the electrodes is common to all the shutter plates in one cell.

A fourth embodiment of the light modulator according to the invention that eliminates the above problem is shown in FIG. 6. The embodiment shown in FIG. 6 has the same segmented shutter plate 5 as in the embodiment shown in FIG. 4. However, the light shielding layer 10 is formed on the inside surface of the second substrate 2, and the electrode 7A is reflective, and is not segmented. Instead, a continuous, extended electrode 7A is common to all the shutter plate segments 51, 52 and 53. When the light modulator of the present invention is used as one cell of an array of cells in a display, and simple matrix driving is used to drive the display, the electrode 7A on the first substrate 1 can be made common to all the shutter plate segments 51, 52, 53, . . . in the cell. If the display employs a TFT to drive each cell, the electrode 7A on the first substrate can be made common to all of the cells in the display, or to a subset of all the cells.

In the structure just described, even if there is a lateral offset between the positions of the components mounted on first substrate 1 and those of the components mounted on the second substrate 2, the positional relationship between the electrodes 7A and 7B and the window 3 is not affected. This allows the above-mentioned margin on the dimensions of the components, and the effect of the margin on the aperture ratio, to be eliminated.

In the embodiment shown in FIG. 6, the electrodes 7A and 7B are asymmetrical, irrespective of whether the electrode 7A is common to the shutter plate segments of one cell or is common to the shutter plate segments of multiple cells. Fringe effects caused by the asymmetrical electrodes generate an electrostatic force in the z direction. However, this electrostatic force is usually small, so the effect of this force on the shutter plate 5 can be counteracted by increasing the rigidity of the shutter suspension 6 in the z direction.

If the light modulator of the present invention is used as a cell of a display that displays a pattern set consisting only of numbers, each shutter plate 5, or each shutter plate group, can be driven directly by its own individual driver since the number of pixels is extremely small.

If the light modulator of the present invention is used as a cell in a monochrome or color display in which the cells are arranged in an array, and in which any cell may be addressed, the drive method is basically the same as the matrix drive circuit used in a twisted nematic (TN) liquid crystal display. For example, when the light modulator shown in FIG. 1 is used as a cell in a display having few pixels, each shutter plate 5 can be directly driven by a matrix circuit. If the light modulator is used as a cell in a display having many pixels, each shutter plate 5 can be driven by inserting the nonlinear elements, such as transistors or diodes, as are often used in liquid crystal displays, between the electrodes 7A and 7B and a matrix circuit.

Driving liquid crystal displays with a prolonged unidirectional voltage can degrade the characteristics of the display. A voltage drive whose polarity periodically reverses is therefore preferred to prevent the characteristics of the display from being degraded. This makes the drive circuit complex, and can easily generate flicker. In contrast, a display based on the light modulators according to the present invention is designed to be driven using a unidirectional voltage, so deterioration similar to that which can occur in a liquid crystal display does not occur, the drive circuit is simplified, and flicker is less likely to occur.

The light modulators described above can be applied to monochrome displays with the light source being ambient lighting, such as indoor lighting or natural lighting, or artificial lighting (backlighting), or to color displays that use artificial lighting. The transmitted light or reflected light that is modulated in a two dimensional array in a monochrome display forms an image corresponding to the signal generated by the drive circuit.

In a color display, an array of trichromatic red (R), green (G), and blue (B) filter chips may be arranged on the surface of the first substrate 1 or the second substrate 2, with one filter chip corresponding to each cell.

Figure 7:
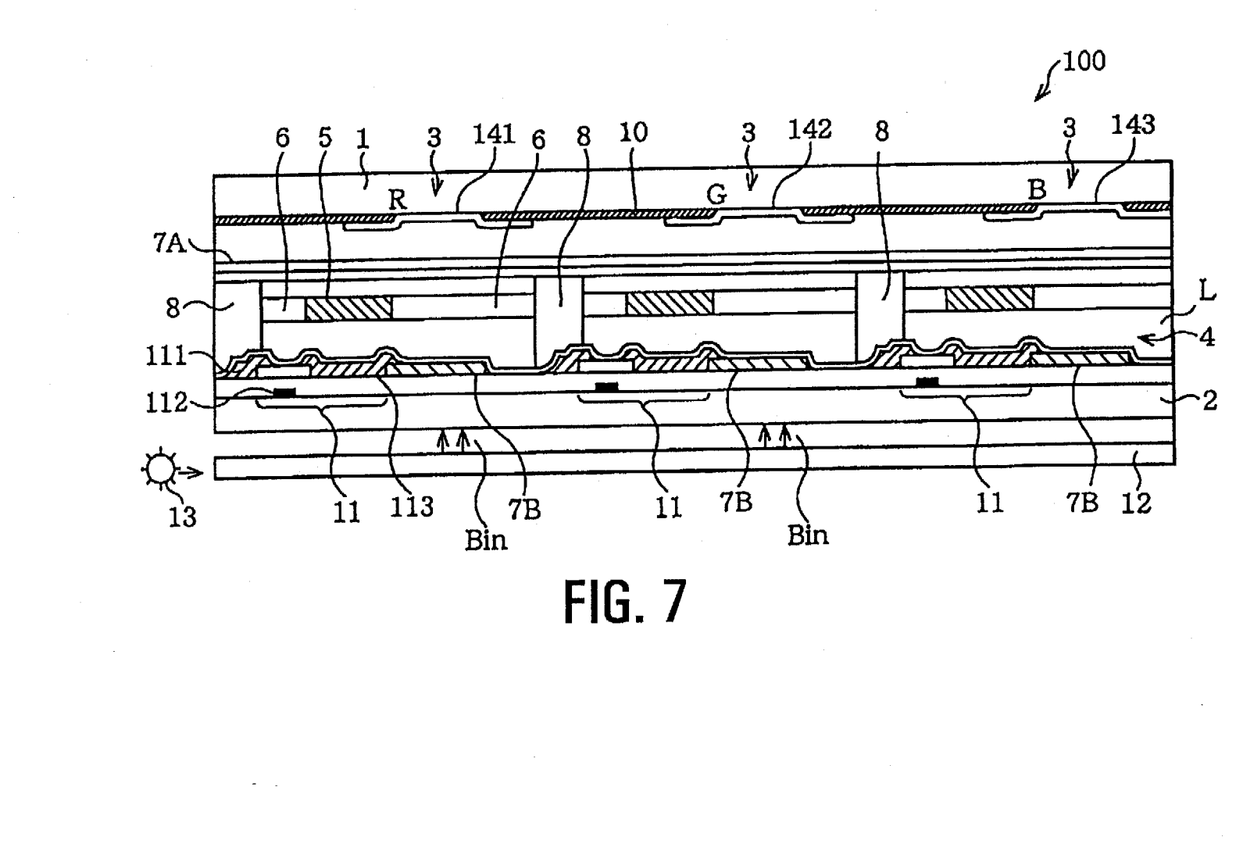
FIG. 7 shows part of a color display composed of multiple light modulators according to the present invention, each light modulator forming a cell of the display. In the embodiment of the light modulator shown, the light shielding layer is located on the second substrate, one of the electrodes is common to all the shutter plate segments of the cell, and a color filter chip is located in the window.

FIG. 7 shows an example of part of a transmission-mode color display incorporating three light modulators according to the invention. FIG. 7 shows an arrangement of three cells.

In each cell, a different one of a red (R) filter chip 141, a green (G) filter chip 142 and a blue (B) filter chip 143 covers the window 3 of the cell. The translucent electrode 7A is common to the three cells, and may be common to all the cells constituting the display. Each cell includes the transparent electrode 7B connected to the thin-film transistor (TFT) 11. The TFT selectively connects the drive voltage to the electrode 7B. The electrodes of the TFT of the cell having the red filter chip 141 are indicated by the reference numerals 111–113. The light source is composed of the light-conducting shutter plate 12 and the fluorescent lamp 13. The light Bin from the light-conducting shutter plate is incident on the second substrate 2. The spacers are indicated by reference numeral 8. The shutter suspension of the cell having the red filter chip are indicated by the reference numeral 6. Each cell is otherwise the same as the cell described above with reference to FIG. 1, and will not be described further.

The color filter chips 141–143 can be formed and can be mounted on the substrate 1 using the same technology used form forming and mounting such filters in conventional color liquid crystal displays. Accordingly, the method of forming and mounting the color filters will not be described in detail.

The light modulator of the present invention may be combined with an optical system and can be applied to a projection display such as an overhead projector.

The light modulator described above can easily be made using micro-lithography or printing, depending on the circumstances.

A process will be described for fabricating a light modulator in which the material of the shutter plate 5 has a low dielectric constant, and in which the dielectric fluid L has a high dielectric constant. In this example, the light modulator is a transmission-mode light modulator, and is one of multiple light modulators constituting the cells of a display having a simple matrix drive. Fabrication of a single light modulator will be described. In practice, all of the light modulators constituting the display are made simultaneously using common processing.

First, the process for making the first substrate assembly on the first substrate 1 will be described with reference to FIGS. 8A–8D.

Figure 8A:
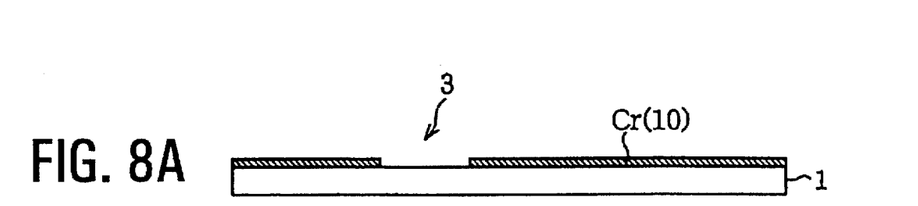
FIGS. 8A–8D illustrate the process that may be used to fabricate the first substrate assembly.

(1-a) The first substrate 1 is a sheet of glass about 1 mm thick. A layer of chromium about 1,000 Å thick is deposited on one surface of the first substrate to provide the light shielding layer 10. Parts of the layer of chromium is removed to form the window 3, as shown in FIG. 8A.

Figure 8B:
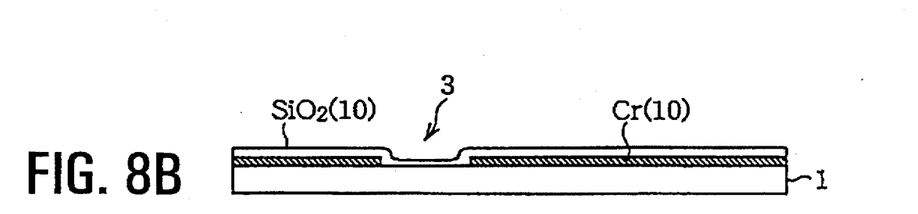

(1-b) A layer of SiO$_2$ about 1,000 Å thick is next deposited, as shown in FIG. 8B.

Figure 8C:
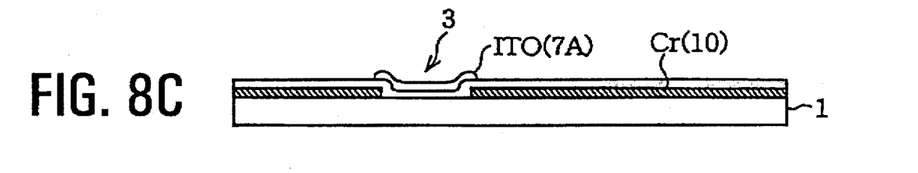

(1-c) A layer of indium tin oxide (ITO) about 1,000 Å thick is next deposited. The ITO layer is translucent. Parts of the ITO layer are selectively removed to define the electrode 7A covering the window 3, as shown in FIG. 8C.

Figure 8D:
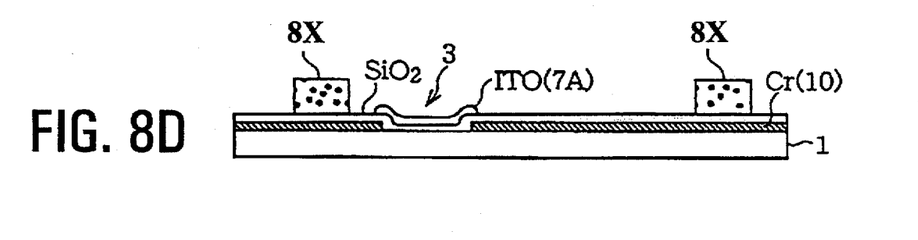

(1-d) A layer of polyimide about 3 μm thick is deposited. Parts of the polyimide layer are selectively remove to form the 1.5 μm-thick first spacer portions 8X, as shown in FIG. 8D.

Next, the process for making the second substrate assembly on the second substrate 2 will be described with reference to FIGS. 9A–9E.

Figure 9A:
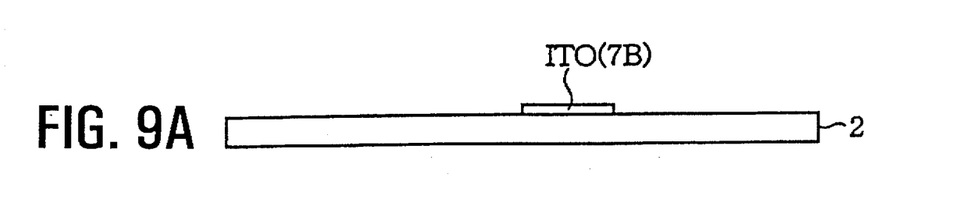
FIGS. 9A–9E illustrate the process that may be used to fabricate the second substrate assembly.

(2-a) The second substrate 2 is a sheet of glass about 1 mm thick. A layer of indium tin oxide (ITO) about 1,000 Å thick is deposited on one surface of the second substrate. Parts of the ITO layer are selectively removed to define the electrode 7B, as shown in FIG. 9A.

Figure 9B:
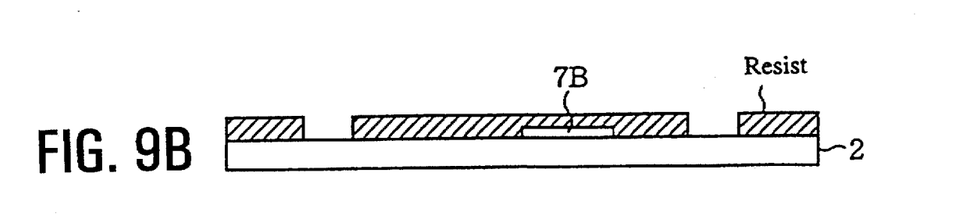

(2-b) The second substrate is coated with a layer of resist about 1.5 μm thick, and holes through which the second spacer portions 8Y will contact the second substrate are opened in the resist, as shown in FIG. 9B.

Figure 9C:
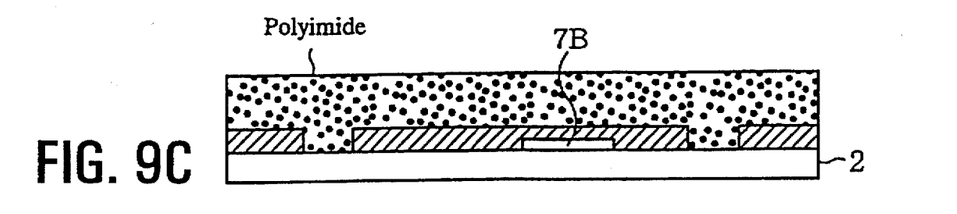

(2-c) The second substrate is next coated with a layer of a photosensitive polyimide about 6 μm thick, as shown in FIG. 9C. The polyimide used contains a black pigment and has a dielectric constant of about 3. The second substrate is then heat treated to drive off solvents in the polyimide. This reduces the thickness of the polyimide layer to the required 3 μm.

Figure 9D:
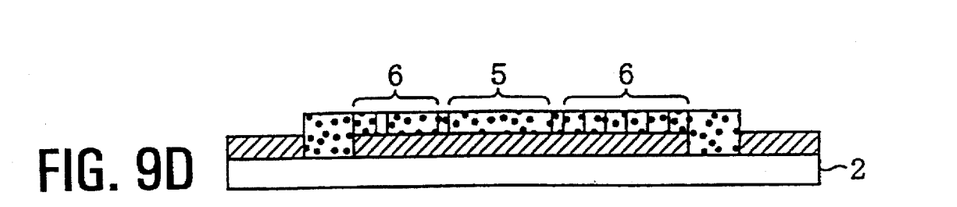

(2-d) Parts of the polyimide layer are selectively removed to define the shutter suspension 6 and shutter plate 5, as shown in FIG. 9D.

Figure 9E:
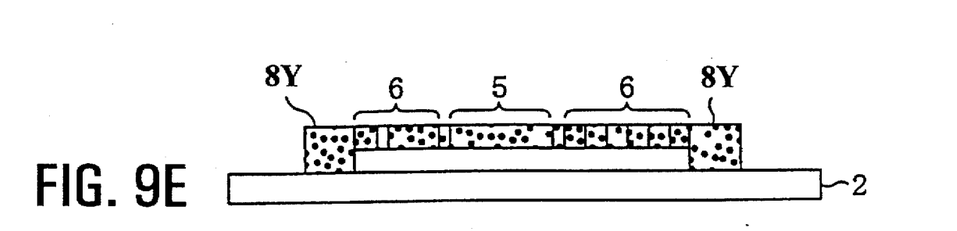

(2-e) The remainder of the layer of resist coated in step (2-b) is removed. This leaves the shutter plate 5 connected to the second spacer portions 8Y by the shutter suspension 6. The shutter plate and the shutter suspension are separated from the second substrate by the thickness of the removed resist layer, as shown in FIG. 9E.

The first substrate assembly and the second substrate assembly, fabricated as described above, are bonded together so that the surfaces of the first and second substrates on which the components are formed face one another. The lateral positions of the substrate assemblies are set so that each of the first spacer portions 8X mate with its corresponding second spacer portion 8Y to form one of the spacers 8. Next, liquid crystal with a dielectric constant of 25 is injected into the cavity 4 created by the spacers between the substrates. Complete filling of the cavity 4 can be ensured by bonding the first substrate assembly and the second substrate while the substrates are immersed in a bath of the liquid crystal.

The light modulator according to the present invention and having one of the structures described above can be applied to two-dimensional filters for various electromagnetic waves, two-dimensional light modulators, and two-dimensional optical computers so that such devices can be made using a simple structure not possible before.

In addition, the light modulator according to the present invention can used as a cell of a display. Using the light modulator according to the invention in a display confers on such a display the main advantages of both cathode ray tubes and liquid crystal displays without their attendant disadvantages.

Although this disclosure describes illustrative embodiments of the invention in detail, it is to be understood that the invention is not limited to the precise embodiments described, and that various modifications may be practiced within the scope of the invention defined by the appended claims.

We claim:

1. A light modulator, comprising:
   a substrate pair including a first substrate and a second substrate positioned parallel to each other and spaced from one another to define a cavity;
   an opaque light shielding layer located on at least one of the substrates, the light shielding layer defining a translucent window;
   a shutter assembly located in the cavity, the shutter assembly including:
      a shutter plate movably mounted adjacent the window,
      a shutter suspension comprising elastic support members disposed between the shutter plate and the substrate pair to movably mount the shutter plate, the shutter suspension having a mechanically-stable position and deforming elastically from the mechanically-stable position in response to a change in overlap between the shutter plate and the window, the overlap between the shutter plate and the window controlling an amount of light passing through the window; and
   electrodes located on at least two of:
      the shutter assembly,
      an inside surface of the first substrate, and
      an inside surface of the second substrate,
      the electrodes being located to change the overlap between the shutter plate and the window by electrostatic force.

2. The light modulator of claim 1, in which:
   the light shielding layer is formed on the first substrate;
   a first one of the electrodes is located on the inside surface of the first substrate and is translucent;
   a second one of the electrodes is located on the inside surface of the second substrate and is translucent; and
   the light passes through the first substrate and the second substrate.

3. The light modulator of claim 1, in which:
   the light shielding layer is formed on the second substrate;
   a first one of the electrodes is located on the inside surface of the first substrate and is translucent;
   a second one of the electrodes is located on the inside surface of the second substrate and is translucent; and
   the light passes through the first substrate and the second substrate.

4. The light modulator of claim 1, in which:
   a first one of the electrodes is located on the inside surface of the first substrate and is translucent;
   a second one of the electrodes is located on the inside surface of the second substrate and is reflecting; and
   the light passes through the first substrate, and not through the second substrate.

5. The light modulator of claim 1, in which the shutter plate is formed from a polymer.

6. The light modulator of claim 1, in which the electrodes are formed only on the first and second substrates.

7. The light modulator of claim 1, additionally comprising spacers disposed between the first substrate and the second substrate, the shutter suspension being connected to the spacers.

8. The light modulator of claim 7, in which:
   the shutter plate includes plural shutter plate segments;
   the light shielding layer defines a window segment corresponding to each of the shutter plate segments; and
   one of the electrodes is divided into an electrode segment corresponding to each of the shutter plate segments.

9. The light modulator of claim 8, in which:
   the shutter plate is formed of a material having a resistivity; and
   the cavity contains a fluid having a resistivity differing from the resistivity of the material of the shutter plate by a factor of greater than ten.

10. The light modulator of any one of claim 8, in which:
    the shutter plate is formed of a material having a dielectric constant; and
    the cavity contains a fluid having a dielectric constant differing from the dielectric constant of the material of the shutter plate by a factor of greater than two.

11. The light modulator of claim 1, additionally comprising a color filter mounted on one of the first substrate and the second substrate in alignment with the window.

12. The light modulator of claim 1, in which:

the shutter plate is formed of a material having a resistivity; and the cavity contains a fluid having a resistivity differing from the resistivity of the material of the shutter plate by a factor of greater than ten.

13. The light modulator of any one of claim 1, in which:

the shutter plate is formed of a material having a dielectric constant; and the cavity contains a fluid having a dielectric constant differing from the dielectric constant of the material of the shutter plate by a factor of greater than two.

14. A display comprising an array of light modulators according to claim 1.

15. The light modulator of claim 1, in which:

the shutter plate includes plural shutter plate segments;

the light shielding layer defines a window segment corresponding to each of the shutter plate segments; and one of the electrodes is divided into an electrode segment corresponding to each of the shutter plate segments.

16. The light modulator of claim 15, in which:

the shutter plate is formed of a material having a resistivity; and the cavity contains a fluid having a resistivity differing from the resistivity of the material of the shutter plate by a factor of greater than ten.

17. The light modulator claim 15, in which:

the shutter plate is formed of a material having a dielectric constant; and the cavity contains a fluid having a dielectric constant differing from the dielectric constant of the material of the shutter plate by a factor of greater than two.

18. A light modulator, comprising:

a substrate pair including a first substrate and a second substrate positioned parallel to each other and spaced from one another to define a cavity;

an opaque light shielding layer located on one of the substrates, the light shielding layer defining a translucent window divided into window segments;

a shutter plate movably mounted in the cavity adjacent the window, the shutter plate including a shutter plate segment corresponding to each of the window segments;

a shutter suspension located in the cavity, the shutter suspension comprising elastic support members disposed between the shutter plate and the substrate pair to movably mount the shutter plate, the shutter suspension having a mechanically-stable position and deforming elastically from the mechanically-stable position in response to a change in overlap between the shutter plate and the window, the overlap between the shutter plate and the window controlling an amount of light passing through the window; and a first electrode located on an inside surface of the first substrate;

a second electrode located on an inside surface of the second substrate , the electrodes being located to change the overlap between the shutter plate and the window by electrostatic force, at least one of the electrodes including an electrode segment corresponding to each of the window segments.

19. The light modulator of claim 18, in which:

the shutter plate is formed of a material having a resistivity; and the cavity contains a fluid having a resistivity differing from the resistivity of the material of the shutter plate by a factor of greater than ten.

20. The light modulator claim 18, in which:

the shutter plate is formed of a material having a dielectric constant; and the cavity contains a fluid having a dielectric constant differing from the dielectric constant of the material of the shutter plate by a factor of greater than two.

\* \* \* \* \*